United States Patent [19]

Astrauskas et al.

[11] 3,987,151

[45] Oct. 19, 1976

[54] MANUFACTURE OF ALKALI METAL AMIDES

[75] Inventors: Peter John Astrauskas, Montreal; Guy Michel Blongin, Beloeil; Sherman Hsien-Jung Chen, Brossard, all of Canada

[73] Assignee: Canadian Industries, Ltd., Montreal, Canada

[22] Filed: Mar. 20, 1975

[21] Appl. No.: 560,157

Related U.S. Application Data

[63] Continuation-in-part of Ser. No. 438,672, Feb. 1, 1974, abandoned.

[30] Foreign Application Priority Data

Feb. 19, 1973  United Kingdom............... 7990/73

[52] U.S. Cl. .............................................. 423/413

[51] Int. Cl.$^2$........................................ C01B 21/00
[58] Field of Search .......... 423/413, 409, 410, 651, 423/194

[56] References Cited

OTHER PUBLICATIONS

Wattenberg, H.; *Deutsche Chemische Gesellschaft Berichte,* vol. 63B, pp. 1667–1672, (1930).

*Primary Examiner*—L. Dewayne Rutledge
*Assistant Examiner*—Michael L. Lewis
*Attorney, Agent, or Firm*—Donald G. Ballantyne

[57] ABSTRACT

A process for the production of alkali metal amides is provided wherein liquid ammonia is reacted with an alkali metal under moderate pressure in the presence of an alkali metal azide as catalyst.

1 Claim, No Drawings

MANUFACTURE OF ALKALI METAL AMIDES

This application is a continuation-in-part of application Ser. No. 438,672 filed on Feb. 1, 1974 and now abandoned.

This invention relates to a process for the preparation of alkali metal amides and more particularly to a such a process whereby improved efficiency and yield may be achieved.

Traditionally, the process employed for the production of an alkali metal amide involves the melting of an alkali metal which is then reacted with anhydrous ammonia gas at an elevated temperature of about 400° C. The process for the manufacture of sodium amide, for example, may be illustrated by the following reaction:

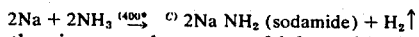

$$2Na + 2NH_3 \xrightarrow{400°C} 2Na\,NH_2\,(\text{sodamide}) + H_2\uparrow$$

A further improved process which avoids the high temperatures required in using ammonia gas, provides for the reaction of a particulate alkali metal with anhydrous liquid ammonia. Such a reaction is described, for example, by Acken et al. in U.S. Pat. No. 2,373,800, granted Apr. 17, 1945. Generally, the reaction is catalysed by means of iron compounds since uncatalysed reactions proceed very slowly and are not commercially practical. Acken et al. employ ferric nitrate as catalyst. J. A. Nieuwland, in U.S. Pat. No. 2,202,994, granted June 4, 1940, proposes the use of a hydrated salt of iron, cobalt or nickel as catalyst while other workers have suggested the use of metallic iron in powder form. The use of these iron or metal salt catalysts, while increasing the speed of reaction, is not without substantial disadvantages because of the great difficulty encountered in filtering off the spent catalyst. Generally, the spent catalyst is left in the reaction product in the form of a viscous slime-like material or a fine flocculant precipitate which quickly clogs filters, valves, pipelines and pumps. The presence of this difficulty-filtered material is particularly disadvantageous especially where continuous manufacturing processes are contemplated.

It is the object of this invention to provide an improved process for the manufacture of alkali metal amides. In particularly, it is the object of this invention to provide an improved catalysed reaction between an alkali metal and anhydrous liquid ammonia at ordinary temperatures and moderate pressure whereby the disadvantages of earlier metal salt and iron-catalysed reactions are avoided.

In accordance with this invention an improvement is provided in the manufacture of an alkali metal amide from liquid ammonia and an alkali metal which comprises reacting liquid ammonia and an alkali metal under superatmospheric pressure in the presence of an alkali metal azide as catalyst.

It has been surprisingly discovered that the reaction between an alkali metal and anhydrous liquid ammonia may be catalysed by the addition of between about 1% and 35%, based on the weight of liquid ammonia solution used, of an alkali metal azide to provide a substantial increase of reaction rate and a useful increase in product yield.

The alkali metal amide produced can be used, for example, as a raw material for the preparation of the corresponding alkali metal azide or may be suitably employed as a vigorous dehydrating agent for the synthesis of indigo or in the preparation of pure hydrazine. It is also an intermediate in the preparation of sodium cyanide and finds application as an aminating agent.

An important feature of the process of this invention is that up to 52 parts by weight of an alkali metal azide may be dissolved completely in 100 parts by weight of liquid ammonia. It thus may be seen that where the alkali metal amide produced is to be subsequently converted to the corresponding azide by the well known method of reacting with nitrous oxide, there is no need to remove the azide catalyst from the amide reaction product. However, where the amide reaction product is required for use in a pure form, the azide catalyst which is in solution may be recovered by filtration or centrifuging of the amide reaction product which can then be further washed with liquid ammonia to remove traces of the azide catalyst. The azide catalyst can be recycled for subsequent catalyst use. Additionally, since the presence of an alkali metal azide in liquid ammonia increases the solubility of an alkali metal amide in the liquid ammonia by 20 - 30 times, the subsequent rate of conversion of the amide to the azide by the conventional nitrous oxide addition method is also substantially increased.

In the practice of the process of the invention a fixed quantity of metallic alkali metal, for example, sodium, is extruded in ribbon form, cut into approximately ½ inch lengths and placed in a reactor vessel. A quantity of pure sodium azide based on the quantity of liquid ammonia to be used is placed in the reactor with the metallic sodium. Liquid anhydrous ammonia is slowly introduced into the reactor under pressure and the reactor contents are agitated. The temperature of the reactor is kept constant by an appropriate cooling-/heating jacket, bath or coil. Pressure is maintained constant in the reactor by controlled venting of the hydrogen gas formed. The hydrogen gas is collected in a receiver and the rate and quantity of the gas produced is used as a measure of the rate and efficiency of the reaction. For each mole of hydrogen gas produced two moles of metallic sodium is converted into sodium amide Ammonia vapour which is vented along with the hydrogen gas may be absorbed in dilute sulphuric acid. When the reaction is complete, reactor temperature begins to drop and pressure no longer increases. The reactor is then vented and the reaction product collected for subsequent processing or use.

The process of the invention may be carried out at pressures ranging from slightly above atmospheric to pressures as high as several hundred atmospheres or more. The limitations in choosing a suitable operating pressure will depend on the desired reaction rate, the temperature of available reactor cooling means and on vessel construction. The reactor temperature is conveniently controlled by a watercooled heat exchanger or water jacket. Since cooling water in summer months in temperate zones reaches about 22° C. and an approach temperature of 10° C. can be expected, ammonia vapor pressure in the reactor will be 12.2 atmospheres under these conditions. Thus under the cooling conditions provided by water in temperate zone summer months, a reactor operating pressure of about 12 atmospheres could be utilized. However, other factors merit consideration in selecting the operating pressure. During the synthesis of amides, ½ mole of hydrogen is released for each mole of alkali metal consumed. This hydrogen must be vented from the system. When operating the reaction at pressures above the vapor pressure of ammonia, ammonia is conserved when the hydrogen is vented since the partial pressure of hydrogen is increased. It can be shown, for example, that at an operating temperature of 40° C. and a reactor pressure of 20 atmospheres, 3.29 moles of ammonia is vented along with each mole of vented hydrogen. However, when the reactor pressure is increased to 70 atmospheres (at 40° C. operating temperature) only 0.28 moles of ammonia is vented with each mole of vented hydrogen. Higher operating pressure thus favor the conservation of ammonia. It can be concluded, therefore, that a practical lower limiting operating pressure based on water cooling efficiency is about 12 atmospheres while an upper limiting operating pressure is governed by the available vessel construction technology and may even be as high as 3000 atmospheres. Practical consideration of costs will determine the selection of the operating pressure.

The quantity of alkali metal azide employed as catalyst is preferably from 1% to about 35% based on the weight of liquid ammonia solution used. The weight ratio of alkali metal azide to liquid ammonia is optimal at a concentration of 52 parts of alkali metal azide to 100 parts of liquid ammonia saturated solution. However, while this 52/100 ratio gives the highest initial rate of reaction in the amide synthesis, it has been found that as the reaction proceeds the dissolution of, for example, the sodium metal reactant in the system is hindered. No such difficult metal dissolution is observed at ratios of about 35/100 or less. It is postulated that in a saturated solution of alkali metal azide in liquid ammonia, the amide synthesis reaction has difficulty going to completion because of a mass transfer problem associated with alkali metal dissolution. The choice of lower azide/ammonia ratios of say, 35 parts by weight of alkali metal azide to 100 parts of liquid ammonia gives an acceptable reaction rate and poses no problems with respect to the solution of the alkali metal.

While the process has been described with particular reference to sodium as the alkali metal and sodium azide as the alkali metal azide, it is to be understood that potassium, lithium, rubidium and cesium metals and metal azides may also be employed as reactants and catalysts in the practice of this invention.

The invention is illustrated with reference to the following Examples.

EXAMPLE 1

Use of Sodium Azide as Catalyst in the Sodium Amide Reaction 8.02 gm. of pure metallic sodium, 120 gm. of pure liquid anhydrous ammonia and 36 gm. of sodium azide were placed in a 300 cm³ mild steel pressure vessel equipped with a magnetic stirrer. The amide reaction was carried out at 30° C. which was held constant by a water bath. The pressure was kept constant at 300 psig. by releasing continuously the hydrogen gas formed during the reaction into a receiver together with some ammonia vapor which was scrubbed out immediately with dilute sulphuric acid. The reaction was completed in 23 minutes. The total volume of hydrogen gas collected was 3881 cc. at standard conditions. From this collected gas volume, the yield of sodium amide was estimated to be 99.3%.

For comparison in yield and the rate of amide reaction, the following examples illustrate the preparation of sodium amide using reduced iron powder as catalyst in the presence of sodium azide and without.

EXAMPLE 2

Use of Reduced Iron Powder as Catalyst in the Sodium Amide Reaction with Sodium Azide Present 8.0 gm. of pure metallic sodium, 120 gm. of pure liquid ammonia, 36 gm. of sodium azide and 0.08 gm. of reduced iron powder catalyst were introduced into the same 300 cm³ pressure-resistance vessel. The reactor temperature and pressure were held constant at 30° C. and 300 psig. respectively. The total reaction time was 17 minutes, and the volume of hydrogen gas collected was 3600 cc. at standard conditions. The yield of amide was estimated to be 91.4%.

It may be seen that while reaction time was improved by the presence of iron catalyst, the yield of amide was reduced compared to Example 1.

EXAMPLE 3

Use of Reduced Iron Powder as Catalyst in the Sodium Amide Reaction without Sodium Azide Present 8.03 gm. of pure metallic sodium, 120.5 gm. of pure liquid ammonia and 0.241 gm. of reduced iron powder catalyst were placed in the same 300 cm³ reactor. The reactor temperature and pressure were kept the same as previous examples. The total reaction was completed in 155 minutes, and the volume of hydrogen gas collected was 3713 cc. at standard conditions. The yield of amide formation was estimated to be 94.9%.

It may be seen that reaction time was substantially prolonged in the absence of the azide catalyst and that yields were not improved.

EXAMPLE 4

No Reduced Iron Powder Catalyst, No Sodium Azide Present 8.06 gm. of pure metallic sodium and 120 gm. of pure liquid ammonia were introduced into the same 300 cm³ reactor.

The experimental conditions such as temperature and pressure were the same as previous examples. After 7 hours of reaction, only 2054 cc. of hydrogen gas was collected. On examining the reactor contents after ammonia evaporation a small quantity of metallic sodium was found unconverted. Based on the volume of hydrogen gas collected, it was estimated that only 52.4% sodium was converted, but the reaction was not complete. The rate of reaction for sodium disappearance was very slow compared to the previous example.

EXAMPLE 5

Use of Sodium Azide and Potassium Azide as Catalyst in Manufacture of Corresponding and Non-Corresponding Amides Sodium amide was synthesized from sodium metal and liquid ammonia in the presence of potassium azide as catalyst. Potassium amide was similarly synthesized from potassium metal and liquid ammonia in the presence of sodium azide as catalyst. The reactions were carried out at 30° C. as described in Example 1. The length of time for the reactions to go to completion were recorded. For comparison, the reactions were repeated using the corresponding metal azides as catalysts. The results are recorded in the Table below where all quantities given are in grams.

| Test | NH₃ | Sodium | Potassium | Sodium Azide | Potassium Azide | Reaction time (mins.) |
|------|-----|--------|-----------|--------------|-----------------|-----------------------|
| A | 150 | 5 | | 31.3 | | 7.6 |
| B | 150 | | 8.5 | | 39 | 9.0 |
| C | 150 | 5 | | | 39 | 25.25 |
| D | 150 | | 8.5 | 31.3 | | 16.0 |

An examination of the results shown in the Table demonstrates that while the use of the non-corresponding azides as catalysts in Tests C and D resulted in somewhat slower reaction rates, these rates were nevertheless substantially better than the results shown in Examples 3 and 4 where no azide catalysts were used.

What we claim is:

1. In the process for the manufacture of an alkali metal amide from the reaction of liquid ammonia with an alkali metal at superatmospheric pressure and in the presence of a catalyst, the improvement which comprises carrying out the said reaction in the presence of from about 1% to about 35%, based on the weight of liquid ammonia solution, of an alkali metal azide as catalyst to thereby produce a relatively high yield of the alkali metal amide.

* * * * *

UNITED STATES PATENT OFFICE
CERTIFICATE OF CORRECTION

Patent No. 3,987,151    Dated    October 19, 1976

Inventor(s)    Peter John Astrauskas et al.

It is certified that error appears in the above-identified patent and that said Letters Patent are hereby corrected as shown below:

On the cover sheet item [75], "Guy Michel Blongin" should read -- Guy Michel Blondin --.

Signed and Sealed this

Twenty-second Day of February 1977

[SEAL]

Attest:

RUTH C. MASON
*Attesting Officer*

C. MARSHALL DANN
*Commissioner of Patents and Trademarks*